United States Patent
Tabaries

(10) Patent No.: US 12,432,554 B2
(45) Date of Patent: Sep. 30, 2025

(54) METHOD FOR MANAGING INTELLIGENT TRANSPORT SYSTEM COMMUNICATIONS AND CORRESPONDING ELECTRONIC CONTROL UNIT

(71) Applicant: STMicroelectronics (Rousset) SAS, Rousset (FR)

(72) Inventor: Laurent Tabaries, Aubagne (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 219 days.

(21) Appl. No.: 18/205,839

(22) Filed: Jun. 5, 2023

(65) Prior Publication Data

US 2023/0403553 A1    Dec. 14, 2023

(30) Foreign Application Priority Data

Jun. 13, 2022 (FR) ........................................ 2205652

(51) Int. Cl.
  *H04W 12/06* (2021.01)
  *H04W 12/106* (2021.01)

(52) U.S. Cl.
  CPC .......... *H04W 12/06* (2013.01); *H04W 12/106* (2021.01)

(58) Field of Classification Search
  CPC .......... G06F 21/44; G06F 21/78; G06F 21/64; G06F 63/101; G06F 63/123; G06F 2221/2151; H04L 63/101; H04L 63/123; H04W 12/06; H04W 12/106
  See application file for complete search history.

(56) References Cited

U.S. PATENT DOCUMENTS

| | | | |
|---|---|---|---|
| 10,491,235 B1 * | 11/2019 | Ruelke | H04L 1/0025 |
| 11,405,786 B1 * | 8/2022 | Monteuuis | H04W 12/122 |
| 2008/0010207 A1 | 1/2008 | Yanagihara et al. | |
| 2020/0137580 A1 * | 4/2020 | Yang | H04W 12/122 |
| 2020/0213340 A1 | 7/2020 | Hamada | |
| 2021/0344514 A1 | 11/2021 | Barrett et al. | |

FOREIGN PATENT DOCUMENTS

| | | |
|---|---|---|
| EP | 3579522 A1 | 5/2019 |
| JP | 2017046080 A * | 3/2017 |

OTHER PUBLICATIONS

JP2017046080 with English Translation (Year: 2017).*
INPI Search Report and Written Opinion for priority application, FR 2205652, report dated Jan. 13, 2023, 10 pgs.

* cited by examiner

*Primary Examiner* — Matthew T Henning
(74) *Attorney, Agent, or Firm* — Crowe & Dunlevy LLC

(57) ABSTRACT

Disclosed herein is an electronic control unit including a communication circuit designed to receive intelligent transport system (ITS) messages, an authentication circuit for authenticating the received messages, and a secure element containing a hardware-secure non-volatile memory and a continually active clock counter. The secure element is configured to assign a timestamp data item from the clock counter to each of the authenticated received messages and to store the authenticated messages along with their respective timestamp data in the hardware-secure non-volatile memory.

19 Claims, 2 Drawing Sheets

METHOD FOR MANAGING INTELLIGENT TRANSPORT SYSTEM COMMUNICATIONS AND CORRESPONDING ELECTRONIC CONTROL UNIT

PRIORITY CLAIM

This application claims the priority benefit of French Application for Patent No. 2205652, filed on Jun. 13, 2022, the content of which is hereby incorporated by reference in its entirety to the maximum extent allowable by law.

TECHNICAL FIELD

Embodiments and implementations relate to electronic control units (ECUs), typically intended for automobile electronic equipment, that are adapted to communicate in an intelligent transport system type system.

BACKGROUND

Intelligent transport systems (ITS) are the term for electronic and computing technologies provided to digitally manage the field of road transport and logistics, particularly for personal automobiles.

The intelligent transport system is designed for the regulation of automobile traffic by managing messages communicated between cars, "C2X" (which stands for "Car to everything"), also known as "V2X" (which stands for "Vehicle to everything"), and other cars or infrastructure (traffic lights, roundabouts, etc.). The C2X messages are primarily basic safety messages (BSMs), communicating weather alerts, stopped car or accident alerts, signaling malfunction alerts, etc.

The C2X messages are received on the fly, analyzed, and stored in a typically general-purpose non-volatile memory, usually a "Flash" memory, of the electronic control unit. Furthermore, to protect against the risk of corruption of the data stored in the memory, for example, against "hacking" of the memory to access sensitive or confidential information or keys, it is provided that the C2X messages have a very short lifetime, and that their transmissions are repeated very frequently.

Thus, in the intelligent transport system ITS, there is a reception processing target of one thousand (1000) messages received per second. Current electronic control units adapted to ITS communications are not capable of attaining this reception processing target. Indeed, to ensure the reliability of ITS type communications, a digital signature of the sender is typically provided in the C2X messages. The digital signature conventionally uses "PKI" public key infrastructures and "DSA 256" or "ECDSA 256" type signature algorithms (acronyms of the terms "Digital Signature Algorithm" and "Elliptic Curve DSA", respectively, denoting techniques well-known to a person skilled in the art). Thus, for each incoming message, a cryptographic verification of the ECDSA 256 signature is executed in order to authenticate the received message before storing it in memory.

The authentication procedures, particularly of the ECDSA 256 type, typically require a large quantity of computing resources and are relatively time-consuming to implement.

Consequently, when the electronic control unit receives too many messages, a "bottleneck" phenomenon in the received message processing can occur, which lowers the reception bandwidth well below the target mentioned above.

The problem may become worse as cars and infrastructure are equipped for the intelligent transport system ITS, and more and more messages are communicated.

Conventional proposed solutions to this problem involve increasing the processing capacity of the electronic control units. That being said, the increase in processing capacity also increases energy consumption, the size, and price of the integrated circuits of the electronic control units intended for the automobile.

Thus, there is a need to avoid having to use higher-performance (and therefore larger, more expensive, and more energy-consuming) integrated circuits to meet the high bandwidth requirement while benefiting from superior security and reliability.

SUMMARY

According to an aspect, disclosed herein is an electronic control unit that includes a communication circuit adapted to receive intelligent transport system-type messages, an authentication circuit adapted to authenticate the received messages, and a secure element including a hardware-secure non-volatile memory and a continually active clock counter. The secure element is configured to assign the authenticated received messages a timestamp data item from the clock counter and to record the authenticated received messages and their respective timestamp data in the hardware-secure non-volatile memory. In particular, the secure element, as well as the non-volatile memory, can advantageously include hardware protection circuitry adapted for at least "EAL4+" or higher certification (for example, "EAL5+", or "EAL6+"). Storing the authenticated messages in the hardware-secure non-volatile memory makes it possible to increase the lifetime of the stored messages and thus reduce the number of systematic repeat message processing operations. The timestamp value enables secure and reliable management of the longer message lifetime. Indeed, in a worst-case scenario example, it is possible to evaluate a lifetime, i.e., a trusted lifetime before repeating authentication, that is seven times longer in the hardware-secure non-volatile memory than in a general-purpose non-volatile memory. However, even in this worst case, the repeat message processing operations are reduced as the lifetime is increased, i.e., the number of received message authentications is divided by seven. In practice, the gain can be substantially greater than seven.

According to an embodiment, the continually active clock counter is configured to generate a current reference time base value in both a standby (or low-consumption) operating mode and an active secure element operating mode.

This advantageously makes it possible for the timestamp data to be very reliable, given that it benefits from the security circuitry of the secure element. In particular, the mechanism used by the electronic control unit cannot be compromised by an action performed on an external, potentially non-secure, device generating the time base.

According to an embodiment, the electronic processing unit includes circuitry for managing the received messages configured to assign a lifetime to the messages recorded in the hardware-secure non-volatile memory and to directly reject a received message repeating a previously received, authenticated message recorded in the hardware-secure non-volatile memory, the lifetime of which has not run out.

It is indeed possible to identify whether a repeated received message is already recorded in the non-volatile memory, without processing the repeated message with the authentication circuit. Thus, the rejection procedure of a received message is very fast and makes it possible not to block the system in the event of a large number of received messages.

According to an embodiment, the communication circuit is adapted to wireless communications according to the WiFi 802.11.p protocol (also known as "G5") or according to the 5G protocol.

According to an embodiment, the secure element additionally includes a first list of automatically excluded senders, and the electronic control unit is configured to directly reject a received message from a sender on the first list, without performing the authentication of this message with the authentication circuit. Alternatively or in combination, the secure element also includes a second list of automatically allowed senders, and the electronic control unit is configured to directly record a received message from a sender on the second list in the hardware-secure non-volatile memory or in a non-secure non-volatile memory, without performing the authentication of this message with the authentication circuit. This embodiment particularly has the advantage of offering very fast operation (of rejecting a message without processing, or of recording the message without processing) and makes it possible not to block the system in the event of a large number of received messages, including repeat messages at a high frequency. Furthermore, the risk of extracting or modifying data from the first and second lists is extremely low, given that they benefit from the security of the secure element, such that direct rejections or direct recordings of messages remain reliable despite the lack of authentication.

Moreover, concerning embodiments, a person skilled in the art may, for all practical purposes, refer to the French Patent Application No. 2205653, entitled "Electronic control unit adapted to intelligent transport system communications and corresponding method" filed on Jun. 13, 2022.

According to a further aspect, a method is proposed for managing intelligent transport system-type communications, which includes receiving a message, authenticating the received message, assigning the received and authenticated messages a timestamp data item from a continually active clock counter belonging to a secure element of an electronic control unit, and recording the authenticated received messages and their respective timestamp data in a hardware-secure non-volatile memory belonging to the secure element.

According to an implementation, a current reference time base value is generated by the continually active clock counter, in both a standby operating mode and an active operating mode of the electronic control unit.

According to an implementation, the method includes assigning a lifetime to the messages recorded in the hardware-secure non-volatile memory and directly rejecting a received message repeating a previously received, authenticated message recorded in the hardware-secure non-volatile memory, the lifetime of which has not run out.

According to an implementation, the communications are wireless communications according to the WiFi 802.11.p protocol (or "G5") or according to the 5G protocol.

According to an implementation, a received message is directly rejected, without having performed the authentication of this message, if it is from a sender on a first list of automatically excluded senders contained in the secure element. Alternatively or in combination, a received message is directly recorded in the hardware-secure non-volatile memory or in a non-secure non-volatile memory, without having performed the authentication of this message, if it is from a sender on a second list of automatically allowed senders contained in the secure element.

BRIEF DESCRIPTION OF THE DRAWINGS

Further advantages and features will emerge on studying the detailed description of embodiments and implementations, in no way restrictive, and of the appended drawings wherein.

DETAILED DESCRIPTION

Figure 1:
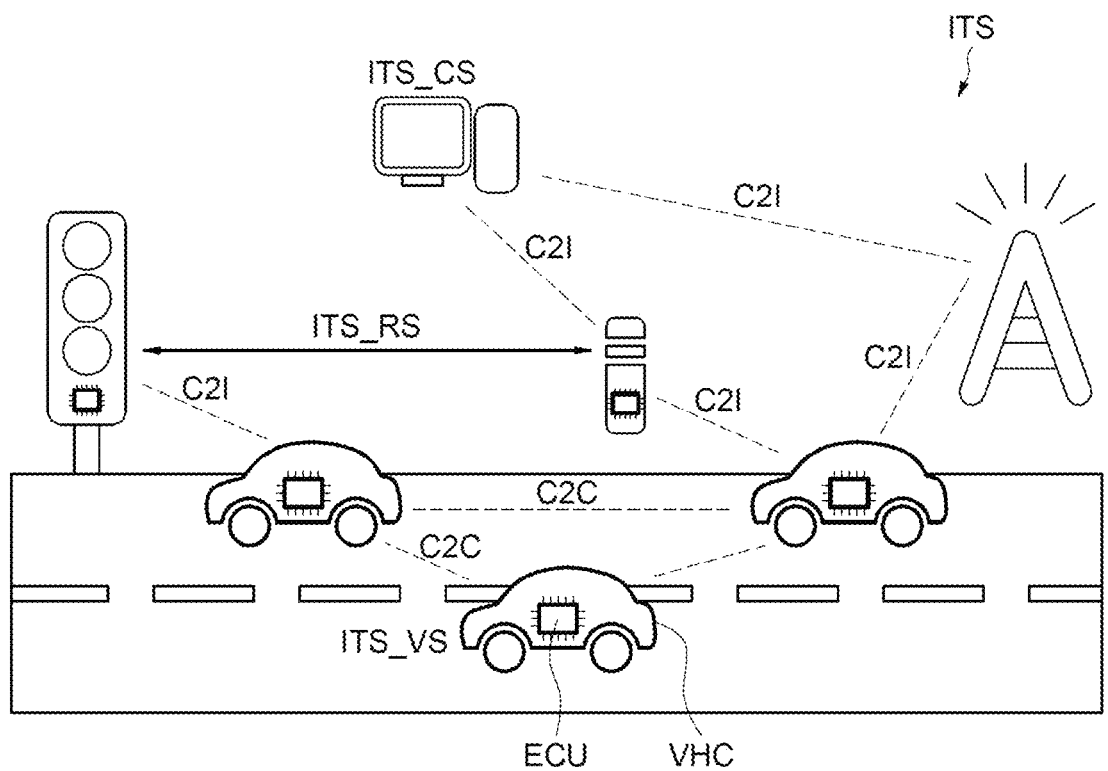
FIG. 1 is a diagrammatical representation of an intelligent transport system disclosed herein.

FIG. 1 illustrates an example of an intelligent transport system (ITS). The ITS includes a network of vehicle stations (ITS_VS), roadway infrastructure stations (ITS_RS), and at least one central station (ITS_CS). The vehicles (VHC), such as automobiles, heavy goods vehicles (i.e., trucks), two-wheeled vehicles, etc., are stations ITS_VS in the system ITS and can communicate with neighboring vehicle stations ITS_VS through car-to-car (C2C) messages. The vehicle stations ITS_VS can also communicate with neighboring road infrastructure stations ITS_RS, such as road signaling elements (traffic lights, markers, etc.), through car-to-infrastructure (C2I) messages, and with the central station ITS_CS through C2I messages via a telecommunication network or via the roadway infrastructure stations ITS_RS. The general messages C2I, C2C are also described by the abbreviation C2X (taken from the term "car to everything").

The C2X messages are particularly basic safety messages (BSMs), communicating weather alerts, stopped car or accident alerts, signaling malfunction alerts, etc. The messages C2X are communicated via a wireless communication protocol, in particular the IEEE 802.11p standard protocol processing wireless accesses in "WAVE" ("Wireless Access to Vehicular Environment") vehicle environments, also known as "G5" or "ITS-G5". The messages C2X can also be communicated via the "5G" protocol, for example as defined in the European Telecommunications Standards Institute standard "ETSI F5G".

Figure 2:
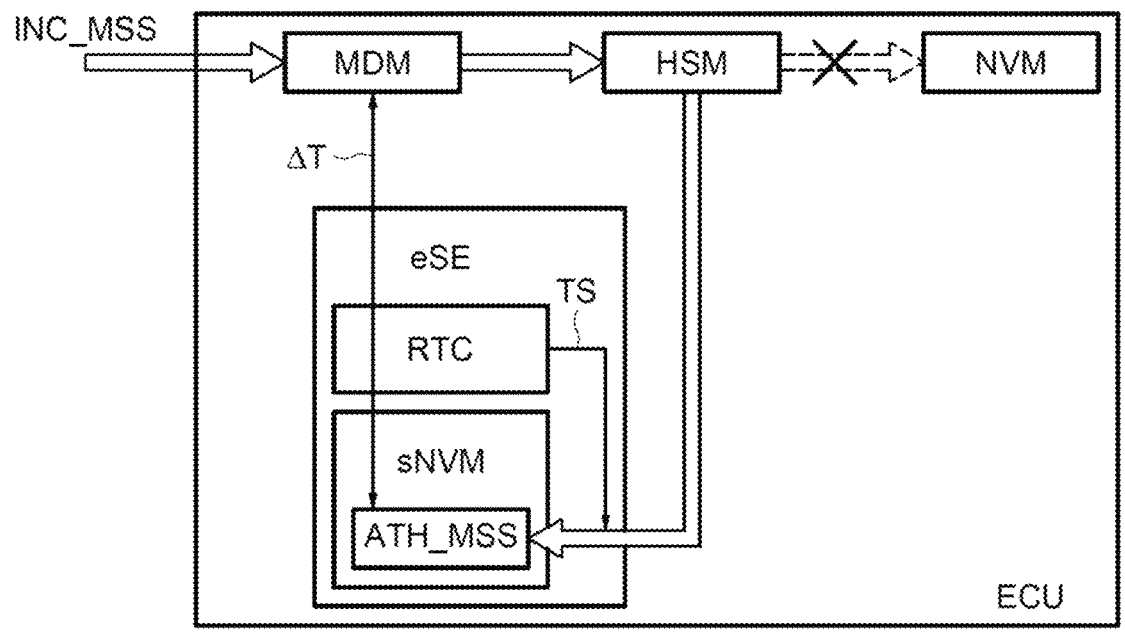
FIG. 2 is a block diagram of the electronic control unit of FIG. 1.

The different stations of the intelligent transport system ITS, particularly the "connected object" type stations ITS_RS, ITS_VS (i.e., the stations other than the central station ITS_CS), include electronic control units (ECU), typically intended for automobile electronic equipment, adapted to implement the C2X (C2C, C2I) communications in the ITS. Reference is made in this regard to FIG. 2.

FIG. 2 illustrates an electronic control unit (ECU) as mentioned with reference to FIG. 1. The ECU can belong to a terrestrial motor vehicle VHC such as an automobile, a heavy goods vehicle, a two-wheeled vehicle, or to a roadway infrastructure device such as traffic lights, a marker, a traffic sign, an information or advertising sign, an emergency call station, or others.

The ECU comprises a communication circuit (MDM), typically a "modem", adapted to wireless communications according to the IEEE 802.11p standard protocol or the 5G protocol, as mentioned hereinabove. In particular, the communication circuit MDM is capable of receiving messages INC_MSS (C2X) from the ITS.

The ECU comprises an authentication circuit (HSM) adapted to authenticate the received messages INC_MSS. For example, the authentication circuit HSM is capable of deciphering a digital signature of the sender of the message INC_MSS. The digital signature is typically encoded in the message INC_MSS by a "DSA_256" or "ECDSA_256" (acronyms of the terms "Digital Signature Algorithm" and "Elliptic Curve DSA", respectively) type 256-bit signature algorithm. Thus, for each incoming message, a cryptographic verification of the ECDSA_256 signature is executed by the authentication circuit HSM.

The ECU typically comprises a general-purpose non-volatile memory (NVM), such as a flash memory. Conventionally, the received messages INC_MSS are recorded in the general-purpose memory NVM after being authenticated. That being said, to limit the risk of data extraction from the memory NVM, in the conventional case, the recorded messages have a very short lifetime and must be repeated regularly, with the cryptographic verification of the signature at each repeat. This conventional implementation is not advantageous, particularly in terms of energy consumption and the use of computing resources of the authentication circuit HSM.

However, the ECU comprises a secure element (eSE) including a hardware-secure non-volatile memory (sNVM) and a continually active clock counter (RTC). The secure element eSE is advantageously configured to assign the received messages authenticated by the authentication circuit HSM a timestamp data item (TS) from said clock counter RTC and to record the authenticated received messages (ATH_MSS) and the respective timestamp data TS in the hardware-secure non-volatile memory sNVM.

For example, the secure element eSE is "secure" in that it includes hardware protections such as active shield, environmental parameter monitoring, fault injection protection, side-channel attack protection circuitry, or other circuitry. More generally, the secure element eSE includes hardware protections capable of obtaining "EAL4+" or "EAL5+" (acronym of the terms "Evaluation Assurance Level 4+/5+") common criteria certification, i.e., evaluation assurance level 4 or 5 based on common criteria, typically defined in the ISO-15408 standards. The certification can be obtained, for example, by fulfilling a class 5 advanced vulnerability analysis "AVA_VAN5" (for "Vulnerability Assessment" and "Vulnerability Analysis") of said common criteria.

Thus, the secure element eSE, as well as the non-volatile memory sNVM and the continually active clock counter RTC incorporated therein, are substantially "tamper-proof" (i.e., tamper-proof to the extent of its certification), and the risk of extraction of the data recorded in the hardware-secure non-volatile memory sNVM is much lower than in typical general-purpose memories NVM. Consequently, the lifetime of the authenticated received messages ATH_MSS is much longer in the hardware-secure memory sNVM than in the general-purpose memory NVM; and therefore, the message repeat frequency is much lower.

For example, the worst-case scenario for the EAL5+- certified hardware-secure memory makes it possible to increase the lifetime of the message ATH_MSS by a factor of seven compared to a general-purpose memory NVM. This results in seven times less implementation of the cryptographic verification of the signature by the authentication circuit HSM. In less unfavorable scenarios, the lifetime of the message ATH_MSS can be increased by a factor counted out of several hundred (for example, a factor between 100 "one hundred" and 1000 "one thousand").

In this regard, the electronic control unit can include circuitry for managing received messages, for example, included in a functionality of the communication circuit MDM, or in a functionality of the secure element eSE, or in a functionality of a control unit capable of executing software implementations (not shown). The circuitry for managing received messages is configured to assign a lifetime $\Delta T$ to the messages recorded in the hardware-secure non-volatile memory sNVM, for example, according to the hardware security level of the secure non-volatile memory sNVM and according to the type of message (indeed, a commercial communication message may be considered less critical and have a longer lifetime than a hazard alert message or a message instructing an autonomous vehicle driving action). The circuitry for managing received messages is furthermore configured to directly reject a received message repeating a previously received, authenticated, and recorded message ATH_DAT in the hardware-secure non-volatile memory sNVM, the lifetime $\Delta T$ of which has not run out.

It is indeed possible to identify a message without implementing the authentication processing by the authentication circuit. Thus, the rejection procedure of a received message is very fast and makes it possible not to block the system in the event of a large number of received messages. A direct rejection of a received message consists simply of not processing or recording the message, for example.

The exhaustion of the lifetime can be evaluated by comparing the timestamp data TS assigned to this message and a current "date" value (for example, with a granularity of the order of a microsecond) at the time of receipt of the repeat. Indeed, the continually active clock counter RTC is configured to generate a current reference time base value that can be used to evaluate the exhaustion or not of the lifetime of the messages ATH_MSS.

The continually active clock counter RTC is advantageously configured to generate the current reference time base value both in a standby operating mode, i.e., for example, a degraded low-energy consumption operating mode, and in an active operating mode of the secure element eSE. This advantageously enables the timestamp data item TS to be very reliable, given that it benefits from the security circuitry of the secure element eSE, even in degraded operation in standby mode, unlike external clock generators capable of being compromised by an action performed on the external device.

Figure 3:
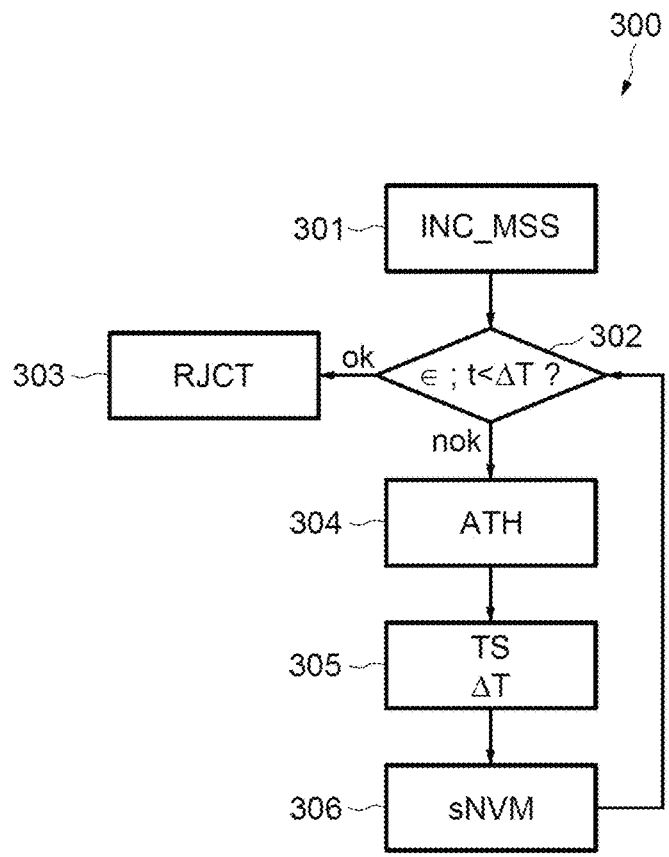
FIG. 3 is a flowchart of a method of managing the communications of the intelligent transport system of FIG. 1.

FIG. 3 illustrates a method 300 corresponding to the management of the communications of the intelligent management system ITS, implemented by the electronic control unit, ECU, described with reference to FIG. 2.

Thus, the method 300 starts with a reception 301 of a message INC_MSS. A step 302 verifies whether the message INC_MSS is already authenticated and recorded in the secure memory sNVM. Advantageously, the step 302 cumulatively verifies that the lifetime $\Delta T$ assigned to the message previously received, authenticated, and recorded in the secure memory sNVM has not run out. The verification of the lifetime can compare the time t elapsed, in the reference time base RTC, between the timestamp data item assigned to the previous message and the reception time 301 "$t<\Delta T$".

If the response is affirmative "ok", the method goes to a step 303 of direct rejection (RJCT) of the received message INC_MSS. If the response is negative "nok", a step 304 of authentication (ATH) of the received message is implemented, as described above in relation to the authentication circuit HSM.

If the message is authenticated, a step 305 assigns the message a timestamp data item TS from the continually active clock counter of the secure element eSE. The timestamp data item corresponds to the time of receipt of the message INC_MSS in the reference time base RTC. Advantageously, the step 305 furthermore assigns a lifetime ΔT to the message, the lifetime ΔT starting to run, in the reference time base RTC, from the time of the timestamp data TS.

Finally, the method comprises a step 306 of recording the authenticated received message and the respective timestamp data item in the hardware-secure non-volatile memory sNVM belonging to the secure element eSE. Consequently, throughout the lifetime ΔT of the message INC_MSS thus recorded, the identical repeat messages of this message will be directly rejected, i.e., not processed by the authentication circuit HSM or recorded in the memory sNVM. This makes it possible to free processing resources for managing other necessary received messages INC_MSS.

Figure 4:
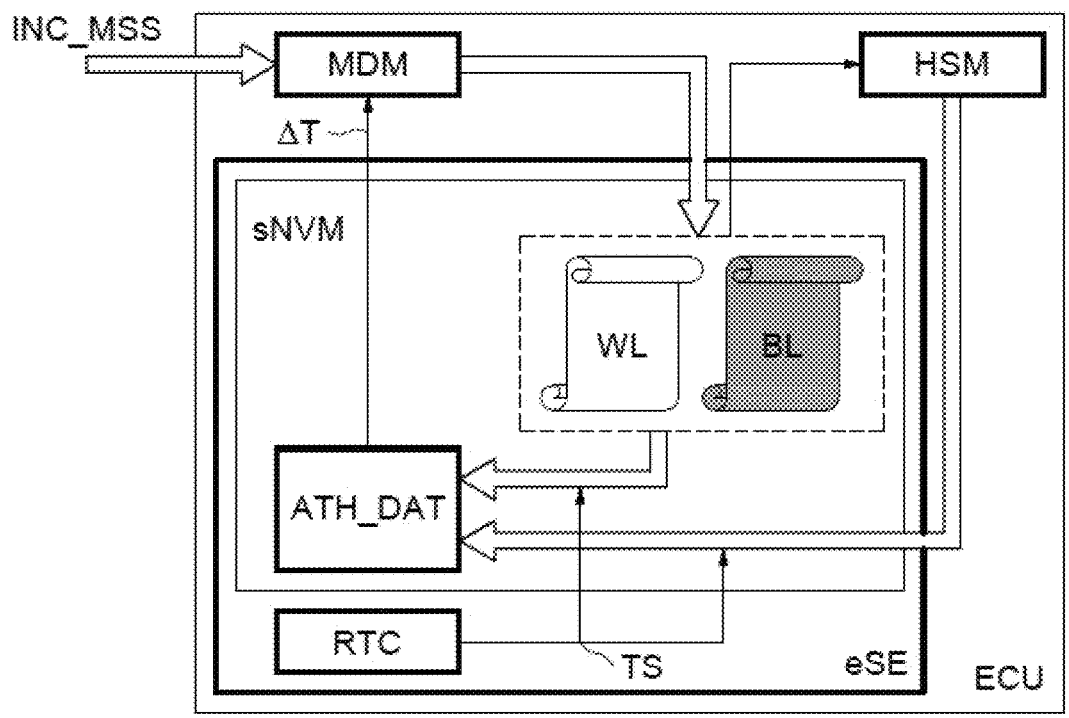
FIG. 4 is a block diagram of another electronic control unit disclosed herein.

Moreover, this disclosure is not restricted to these embodiments and implementations but encompasses all alternative embodiments, for example:

1) With reference to FIG. 4, one aspect proposes combining the technique described above with reference to FIGS. 1 to 3 (the common elements bear the same references and are not detailed once again here) with a technique of the type described in the French Patent Application No. 2205653, entitled "Electronic control unit adapted to intelligent transport system communications and corresponding method", filed on Jun. 13, 2022, the contents of which are incorporated by reference in their entirety to the maximum extent allowable under the law. In detail, in this technique, a received message INC_MSS is directly rejected without performing the authentication with the authentication circuit HSM if it is from a sender on a first "black" list BL of automatically excluded senders contained in the secure element eSE. Alternatively, a received message INC_MSS is directly recorded in the hardware-secure non-volatile memory sNVM without the authentication HSM if it is from a second "white" list WL of automatically allowed senders contained in the secure element eSE.

The secure element eSE is advantageously configured to assign a timestamp data item TS from the clock counter RTC to the received messages from a sender on the white list WL or to the received and authenticated messages (i.e., the received messages from a sender absent from the black list BL and absent from the white list WL) and to save these messages ATH_DAT and their respective timestamp data TS in the hardware-secure non-volatile memory sNVM.

Thus, the direct rejection (identified in the black list BL) of a received message, meaning the message is not processed or recorded, is very fast and makes it possible not to block the system in the case of a large number of received messages. Similarly, the direct recording (identified in the white list WL) of a received message is very fast and makes it possible not to block the system in the event of a large number of received messages, including repeated messages at a high frequency.

2) In a further aspect, a terrestrial motor vehicle is proposed, incorporating an electronic control unit, ECU, as described above with reference to FIGS. 1 to 4.

3) In another aspect, a roadway infrastructure device is proposed, incorporating an electronic control unit, ECU, as described above with reference to FIGS. 1 to 4.

The invention claimed is:

1. An electronic control unit, comprising:
   a communication circuit configured to receive intelligent transport system (ITS) messages;
   an authentication circuit configured to authenticate the received ITS messages; and
   a secure element including a hardware-secure non-volatile memory and a continually active clock counter, wherein the secure element is configured to assign a timestamp data item from said continually active clock counter to each of the authenticated received ITS messages, and to record said authenticated received ITS messages and their respective timestamp data in the hardware-secure non-volatile memory;
   circuitry for managing received messages configured to assign a lifetime to the authenticated received ITS messages recorded in the hardware-secure non-volatile memory according to a hardware security level of the hardware-secure non-volatile memory and according to a type of message.

2. The electronic control unit according to claim 1, wherein the continually active clock counter is configured to generate a current reference time base value, in both a standby operating mode and an active secure element operating mode.

3. The electronic control unit according to claim 1, further including circuitry configured to manage the received ITS messages by assigning a lifetime to each of the authenticated received ITS messages recorded in the hardware-secure non-volatile memory, and directly rejecting a received ITS message that repeats a previously received, authenticated, and recorded ITS message in the hardware-secure non-volatile memory if the lifetime of the previously received, authenticated, and recorded ITS message has not yet expired.

4. The electronic control unit according to claim 1, wherein the communication circuit is configured for wireless communications according to an IEEE 802.11p standard protocol or according to a 5G protocol.

5. The electronic control unit according to claim 1, wherein the secure element further comprises a first list of automatically excluded senders and wherein the electronic control unit is configured to directly reject a received ITS message from a sender on the first list, without performing authentication of this ITS message with the authentication circuit.

6. The electronic control unit according to claim 5, wherein the secure element further comprises a second list of automatically allowed senders, and the electronic control unit is configured to directly record a received ITS message from a sender from the second list in the hardware-secure non-volatile memory without performing the authentication of this received ITS message with the authentication circuit.

7. The electronic control unit according to claim 1, wherein the secure element further comprises a second list of automatically allowed senders, and the electronic control unit is configured to directly record a received ITS message from a sender from the second list in a non-secure non-volatile memory without performing the authentication of this received ITS message with the authentication circuit.

8. The electronic control unit according to claim 1, wherein the authentication circuit comprises a hardware security module (HSM) configured to authenticate the received ITS messages.

9. The electronic control unit according to claim 8, wherein the HSM uses a stored cryptographic key in performing the authentication of the received ITS messages.

10. A method for managing intelligent transport system (ITS) communications, comprising:
- receiving an ITS message;
- authenticating the received ITS message;
- assigning each received and authenticated ITS messages a timestamp data item from a continually active clock counter belonging to a secure element of an electronic control unit; and
- recording said authenticated received ITS messages and their respective timestamp data in a hardware-secure non-volatile memory belonging to the secure element;
- managing received messages by circuitry separate from circuitry used for receiving the ITS message, wherein managing received messages includes assigning a lifetime to the authenticated received ITS messages recorded in the hardware-secure non-volatile memory according to a hardware security level of the hardware-secure non-volatile memory and according to a type of message.

11. The method according to claim 10, wherein a current reference time base value is generated by the continually active clock counter, in both a standby operating mode and an active operating mode of the electronic control unit.

12. The method according to claim 10, further comprising assigning a lifetime to the authenticated received ITS messages recorded in the hardware-secure non-volatile memory, and directly rejecting a received ITS message that repeats a previously received, authenticated ITS message recorded in the hardware-secure non-volatile memory if the lifetime of the previously received, authenticated ITS message has not yet expired.

13. The method according to claim 10, wherein the ITS messages are received via wireless communications in accordance with an IEEE 802.11p standard protocol or a 5G protocol.

14. The method according to claim 10, wherein a received ITS message is directly rejected without performing authentication if it is from a sender on a first list of automatically excluded senders contained in the secure element, and, in combination, a received ITS message is directly recorded in the hardware-secure non-volatile memory without performing authentication if it is from a sender on a second list of automatically allowed senders contained in the secure element.

15. The method according to claim 10, wherein a received ITS message is directly rejected without performing authentication if it is from a sender on a first list of automatically excluded senders contained in the secure element, and, in combination, a received ITS message is directly recorded in a non-secure non-volatile memory without performing authentication if it is from a sender on a second list of automatically allowed senders contained in the secure element.

16. The method according to claim 10, wherein a received ITS message is directly recorded in the hardware-secure non-volatile memory or a non-secure non-volatile memory without performing authentication if it is from a sender on a second list of automatically allowed senders contained in the secure element.

17. An intelligent transport system (ITS), comprising:
- a network of vehicle stations, roadway infrastructure stations, and at least one central station;
- wherein vehicles are configured to communicate with neighboring vehicle stations through car-to-car messages, with neighboring road infrastructure stations through car-to-infrastructure messages, and with the central station through car-to-infrastructure messages via at least one of a telecommunication network and the roadway infrastructure stations;
- an authentication circuit within at least one of the vehicles, vehicle stations, and neighboring road infrastructure stations configured to authenticate a received message, assign a timestamp data item from a continually active clock counter belonging to a secure element of an electronic control unit to the messages, and record the messages in a hardware-secure non-volatile memory belonging to the secure element along with the respective timestamp data; and
- circuitry associated with the authentication circuit and configured to manage the messages by assigning a lifetime to the authenticated received ITS messages recorded in the hardware-secure non-volatile memory, directly rejecting a received message repeating a previously received, authenticated message recorded in the hardware-secure non-volatile memory, the lifetime of which has not run out;
- wherein the circuitry for managing received messages assigns a lifetime to the messages recorded in the hardware-secure non-volatile memory according to a hardware security level of the hardware-secure non-volatile memory and according to a type of message.

18. The intelligent transport system of claim 17, wherein the authentication circuit is configured to decipher a digital signature of a sender of the message, the digital signature being encoded in the message.

19. The intelligent transport system of claim 17, wherein the continually active clock counter is configured to generate a current reference time base value used to evaluate whether a lifetime of the messages has run out.

* * * * *